US008002880B2

(12) United States Patent
Carruthers (10) Patent No.: US 8,002,880 B2
(45) Date of Patent: *Aug. 23, 2011

(54) GAS STORAGE AND DISPENSING SYSTEM WITH MONOLITHIC CARBON ADSORBENT

(75) Inventor: J. Donald Carruthers, Fairfield, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/392,077

(22) Filed: Feb. 24, 2009

(65) Prior Publication Data

US 2009/0188392 A1    Jul. 30, 2009

Related U.S. Application Data

(63) Continuation-in-part of application No. 11/103,224, filed on Apr. 11, 2005, now Pat. No. 7,494,530, which is a continuation-in-part of application No. 10/767,901, filed on Jan. 29, 2004, now Pat. No. 6,939,394, which is a continuation of application No. 10/315,635, filed on Dec. 10, 2002, now Pat. No. 6,743,278.

(51) Int. Cl.
*B01D 53/04* (2006.01)
*B01J 20/20* (2006.01)

(52) U.S. Cl. ......................................... 96/108; 502/526

(58) Field of Classification Search .................... 96/108; 95/90, 901, 903; 206/0.7; 502/416, 526
See application file for complete search history.

(56) References Cited

U.S. PATENT DOCUMENTS

| 240,423 A | 4/1881 | James |
| 1,608,155 A | 11/1926 | Barnebey |
| 1,714,245 A | 5/1929 | Schaefer |
| 2,356,334 A | 8/1944 | Maude et al. |
| 2,423,702 A | 7/1947 | Hart |
| 2,450,289 A | 9/1948 | Marek |
| 2,663,626 A | 12/1953 | Spangler |
| 2,971,607 A | 2/1961 | Caswell et al. |

(Continued)

FOREIGN PATENT DOCUMENTS

DE    1 095 796 A1    12/1960

(Continued)

OTHER PUBLICATIONS

Carrott, P. J. M., et al., "A New Method for the Determination of Micropore Size Distribution", "Characterization of Porous Solids; Unger, K.K., et al., Editors", 1988, pp. 89-100, Publisher: Elsevier Science Publishers, B.V., Published in: Amsterdam, The Netherlands.

(Continued)

*Primary Examiner* — Frank M Lawrence
(74) *Attorney, Agent, or Firm* — Steven Hultquist; Hultquist IP; Rosa Yaghmour (57) ABSTRACT

A pyrolyzed monolith carbon physical adsorbent that is characterized by at least one of the following characteristics: (a) a fill density measured for arsine gas at 25° C. and pressure of 650 torr that is greater than 400 grams arsine per liter of adsorbent; (b) at least 30% of overall porosity of the adsorbent including slit-shaped pores having a size in a range of from about 0.3 to about 0.72 nanometer, and at least 20% of the overall porosity including micropores of diameter<2 nanometers; and (c) having a bulk density of from about 0.80 to about 2.0 grams per cubic centimeter, preferably from 0.9 to 2.0 grams per cubic centimeter.

20 Claims, 7 Drawing Sheets

U.S. PATENT DOCUMENTS

| | | | |
|---|---|---|---|
| 2,987,139 A | 6/1961 | Bush |
| 2,997,371 A | 8/1961 | Wadsworth et al. |
| 3,006,153 A | 10/1961 | Cook |
| 3,080,307 A | 3/1963 | Rinald |
| 3,093,564 A | 6/1963 | Weisman et al. |
| 3,116,132 A | 12/1963 | Haller et al. |
| 3,144,200 A | 8/1964 | Taylor et al. |
| 3,264,803 A | 8/1966 | Read |
| 3,287,432 A | 11/1966 | Sensel |
| 3,415,069 A | 12/1968 | Hauser |
| 3,469,375 A | 9/1969 | Barrington et al. |
| 3,539,467 A | 11/1970 | Bozarth et al. |
| 3,675,392 A | 7/1972 | Reighter |
| 3,713,273 A | 1/1973 | Coffee |
| 3,719,026 A | 3/1973 | Sand |
| 3,788,036 A | 1/1974 | Lee et al. |
| 3,884,830 A | 5/1975 | Grant |
| 3,912,472 A | 10/1975 | Marble |
| 4,000,236 A | 12/1976 | Redfarn et al. |
| 4,023,701 A | 5/1977 | Dockery |
| 4,082,694 A | 4/1978 | Wennerberg et al. |
| 4,139,416 A | 2/1979 | Palumbo et al. |
| 4,263,018 A | 4/1981 | McCombs et al. |
| 4,302,224 A | 11/1981 | McCombs et al. |
| 4,343,770 A | 8/1982 | Simons |
| 4,373,938 A | 2/1983 | McCombs |
| 4,378,982 A | 4/1983 | McCombs |
| 4,414,005 A | 11/1983 | De Bievre et al. |
| 4,526,887 A | 7/1985 | Sutt, Jr. |
| 4,528,281 A | 7/1985 | Sutt, Jr. |
| 4,540,678 A | 9/1985 | Sutt, Jr. |
| 4,578,256 A | 3/1986 | Nishino et al. |
| 4,723,967 A | 2/1988 | Tom |
| 4,738,693 A | 4/1988 | Tom |
| 4,738,694 A | 4/1988 | Godino et al. |
| 4,738,753 A | 4/1988 | Corato et al. |
| 4,744,221 A | 5/1988 | Knollmueller |
| 4,749,384 A | 6/1988 | Nowobilski et al. |
| 4,788,973 A | 12/1988 | Kirchgeorg et al. |
| 4,830,643 A | 5/1989 | Sassa et al. |
| 4,880,765 A | 11/1989 | Knoblauch et al. |
| 4,881,958 A | 11/1989 | Eckardt et al. |
| 4,957,897 A | 9/1990 | Maroldo et al. |
| 4,964,524 A | 10/1990 | Halene |
| 4,967,934 A | 11/1990 | Andonian |
| 4,989,160 A | 1/1991 | Garrett et al. |
| 5,051,117 A | 9/1991 | Prigge et al. |
| 5,071,820 A | 12/1991 | Quinn et al. |
| 5,089,244 A | 2/1992 | Parent et al. |
| 5,110,328 A | 5/1992 | Yokota et al. |
| 5,112,367 A | 5/1992 | Hill |
| 5,133,787 A | 7/1992 | Diot et al. |
| 5,151,395 A | 9/1992 | Tom |
| 5,202,096 A | 4/1993 | Jain |
| 5,213,769 A | 5/1993 | Whitlock |
| 5,238,469 A | 8/1993 | Briesacher et al. |
| 5,356,852 A | 10/1994 | DeLiso et al. |
| 5,372,619 A | 12/1994 | Greinke et al. |
| 5,376,609 A | 12/1994 | Guile |
| 5,409,526 A | 4/1995 | Zheng et al. |
| 5,416,056 A | 5/1995 | Baker |
| 5,417,742 A | 5/1995 | Tamhankar et al. |
| 5,429,662 A | 7/1995 | Fillet |
| 5,512,087 A | 4/1996 | Varner et al. |
| 5,518,528 A | 5/1996 | Tom et al. |
| 5,549,736 A | 8/1996 | Coffield et al. |
| 5,614,459 A | 3/1997 | Mondragon et al. |
| 5,658,372 A | 8/1997 | Gadkaree |
| 5,674,462 A | 10/1997 | Hayden et al. |
| 5,676,735 A | 10/1997 | McManus |
| 5,704,965 A | 1/1998 | Tom et al. |
| 5,704,967 A | 1/1998 | Tom et al. |
| 5,707,424 A | 1/1998 | Tom et al. |
| 5,710,092 A | 1/1998 | Baker |
| 5,744,421 A | 4/1998 | Robinson et al. |
| 5,800,596 A | 9/1998 | Collin et al. |
| 5,833,936 A | 11/1998 | Euzen et al. |
| 5,837,741 A | 11/1998 | Schwarz et al. |
| 5,846,639 A | 12/1998 | Robinson et al. |
| 5,851,403 A | 12/1998 | Petrisko et al. |
| 5,876,487 A | 3/1999 | Dahlgren et al. |
| 5,902,562 A | 5/1999 | Lagasse et al. |
| 5,912,424 A | 6/1999 | Judkins et al. |
| 5,914,294 A | 6/1999 | Park et al. |
| 5,917,140 A | 6/1999 | Tom |
| 5,935,305 A | 8/1999 | Tom et al. |
| 5,961,697 A | 10/1999 | McManus et al. |
| 5,965,483 A | 10/1999 | Baker et al. |
| 5,972,253 A | 10/1999 | Kimber |
| 6,006,797 A | 12/1999 | Buelow et al. |
| 6,019,823 A | 2/2000 | Tischler et al. |
| 6,030,698 A | 2/2000 | Burchell et al. |
| 6,089,027 A | 7/2000 | Wang et al. |
| 6,101,816 A | 8/2000 | Wang et al. |
| 6,132,492 A | 10/2000 | Hultquist et al. |
| 6,155,289 A | 12/2000 | Carlsen et al. |
| 6,156,697 A | 12/2000 | Gadkaree |
| 6,171,373 B1 | 1/2001 | Park et al. |
| 6,187,713 B1 | 2/2001 | Gadkaree |
| 6,207,264 B1 | 3/2001 | Robinson et al. |
| 6,225,257 B1 | 5/2001 | Putyera et al. |
| 6,258,300 B1 | 7/2001 | Burchell et al. |
| 6,284,705 B1 | 9/2001 | Park et al. |
| 6,298,515 B1 | 10/2001 | Robinson |
| 6,309,446 B1 | 10/2001 | Nakanoya et al. |
| 6,309,449 B1 | 10/2001 | Klos et al. |
| 6,406,519 B1 | 6/2002 | Tom et al. |
| 6,436,175 B1 | 8/2002 | Coates et al. |
| 6,453,924 B1 | 9/2002 | Wang et al. |
| 6,475,411 B1 | 11/2002 | Burchell et al. |
| 6,500,238 B1 | 12/2002 | Brandes et al. |
| 6,521,019 B2 | 2/2003 | Jain et al. |
| 6,561,213 B2 | 5/2003 | Wang et al. |
| 6,592,653 B2 | 7/2003 | Wang et al. |
| 6,626,981 B2 | 9/2003 | Wojtowicz et al. |
| 6,670,304 B2 | 12/2003 | Chang |
| 6,699,561 B2 | 3/2004 | Wolff |
| 6,743,278 B1 | 6/2004 | Carruthers |
| 6,764,755 B2 | 7/2004 | Tom et al. |
| 6,793,718 B2 | 9/2004 | Mochizuki et al. |
| 6,939,394 B2 | 9/2005 | Carruthers |
| 6,991,671 B2 | 1/2006 | Brestovansky et al. |
| D545,393 S | 6/2007 | Brestovansky et al. |
| 7,455,719 B2 | 11/2008 | Carruthers |
| 7,494,530 B2 | 2/2009 | Carruthers |
| 7,501,010 B2 | 3/2009 | Brestovansky et al. |
| 2002/0020292 A1 | 2/2002 | Wojtowicz et al. |
| 2002/0073847 A1 | 6/2002 | Sheline et al. |
| 2002/0194989 A1 | 12/2002 | Tuma et al. |
| 2003/0145731 A1 | 8/2003 | Biasio |
| 2003/0196553 A1 | 10/2003 | Mochizuki et al. |
| 2003/0205581 A1 | 11/2003 | Wertenberger |
| 2005/0014643 A1 | 1/2005 | Lini et al. |
| 2009/0173225 A1 | 7/2009 | Brestovansky et al. |

FOREIGN PATENT DOCUMENTS

| | | |
|---|---|---|
| DE | 2 264 512 A | 1/1974 |
| DE | 31 39 781 A | 4/1983 |
| EP | 0344917 A1 | 12/1989 |
| EP | 0 860 640 A1 | 8/1998 |
| EP | 1 072 839 A2 | 1/2001 |
| FR | 2 550 466 A1 | 2/1985 |
| GB | 2 232 364 A | 12/1990 |
| JP | 52-072373 A | 6/1977 |
| JP | 55073315 A1 | 6/1980 |
| JP | 56-158087 A | 12/1981 |
| JP | 56-158126 A | 12/1981 |
| JP | 60-150831 A | 8/1985 |
| JP | 61-133116 A | 6/1986 |
| JP | 61-144495 A | 7/1986 |
| JP | 63-088017 A | 4/1988 |
| JP | 1131015 A1 | 5/1989 |
| JP | 02-066399 A | 3/1990 |
| JP | 04-224102 A | 8/1992 |
| JP | 7124468 A1 | 5/1995 |
| JP | 09-242995 A | 9/1997 |
| JP | 11082891 A | 3/1999 |

| | | | |
|---|---|---|---|
| JP | 2000-028098 A1 | 1/2000 |
| JP | 2000-205496 A1 | 7/2000 |
| JP | 2001287905 A | 10/2001 |
| JP | 2002-158021 A | 5/2002 |
| JP | 2002156097 A | 5/2002 |
| WO | 9407794 A1 | 4/1994 |
| WO | 9500234 A1 | 1/1995 |
| WO | 9716509 A | 5/1997 |
| WO | 9744118 A1 | 11/1997 |
| WO | 9959700 A1 | 11/1999 |
| WO | 0015330 A1 | 3/2000 |
| WO | 0193985 A1 | 12/2001 |
| WO | 02051525 A1 | 7/2002 |

OTHER PUBLICATIONS

Dacey, J. R., et al., "Adsorption on Saran Charcoal: A New Type of Molecular Sieve", "Trans. Farad. Soc.", Mar. 6, 1954, pp. 740-748, vol. 50.

Dacey, J.R., et al., "The formation of carbon from polyvinylidene chloride", "Reprint from the Proceedings of the Fourth Conference on Carbon", 1960, pp. 315-319, Publisher: Pergamon Press.

Quinn, D.F., et al., "Natural Gas Storage", "Carbon", 1992, pp. 1097-1103, vol. 30, No. 7, Publisher: Pergamon Press.

Dacey, J.R., et al., "Adsorption on saran charcoal: a new type of molecular sieve", "Trans. Farad. Soc.", 1954, pp. 740-748, vol. 50.

MacDonald, J.A.F., et al., "Carbon Adsorbents for Natural Gas Storage", "Fuel", 1998, pp. 61-64, vol. 77, No. 1/2, Publisher: Elsevier, Published in: Great Britain.

Parkyns, Norman D., et al., "Chapter 11: Natural Gas Adsorbed on Carbon", "Porosity in Carbons: Characterization and Applications; Patrick, J.W., Editor", 1995, pp. 291-325, Publisher: Halsted Press, Published in: New York.

Wojtowicz, Marek A., et al., "Microporous Carbon Adsorbents for Hydrogen Storage", "Int. J. of The Soc. of Mat. Eng. for Resources", 1999, pp. 253-266, vol. 7, No. 2.

Rouquerol, Francoise, et al., "Chapter 9.5.4: Adsorption of water vapor", "Adsorption by Powders and Porous Solids: Principles, methodology, and applications", 1999, pp. 276-277, Publisher: Academic Press.

Sing, K. S. W., et al., "Reporting Physisorption Data for Gas/Solid Systems with Special Reference to the Determination of Surface Area . . . ", "Pure Appl. Chem.", 1985, pp. 603-619, vol. 57, No. 4.

Unpublished U.S. Appl. No. 12/401,325 , filed Mar. 10, 2009.

Polarz, S. et al. , "Nanoporous Materials", "Journal of Nanoscience and Nanotechnology", 2002, pp. 581-612, vol. 2, No. 6.

FIG.7

GAS STORAGE AND DISPENSING SYSTEM WITH MONOLITHIC CARBON ADSORBENT

CROSS-REFERENCE TO RELATED APPLICATIONS

This is a continuation-in-part of U.S. patent application Ser. No. 11/103,224 filed Apr. 11, 2005 in the name of J. Donald Carruthers for "GAS STORAGE AND DISPENSING SYSTEM WITH MONOLITHIC CARBON ADSORBENT," issued Feb. 24, 2009 as U.S. Pat. No. 7,494,530, which in turn is a is a continuation-in-part of U.S. patent application Ser. No. 10/767,901 filed Jan. 29, 2004 in the name of J. Donald Carruthers for "GAS STORAGE AND DISPENSING SYSTEM WITH MONOLITHIC CARBON ADSORBENT," issued Sep. 6, 2005 as U.S. Pat. No. 6,939,394, which in turn is a continuation of U.S. patent application Ser. No. 10/315,635 filed Dec. 10, 2002 in the name of J. Donald Carruthers for "GAS STORAGE AND DISPENSING SYSTEM WITH MONOLITHIC CARBON ADSORBENT," issued Jun. 1, 2004 as U.S. Pat. No. 6,743,278.

FIELD OF THE INVENTION

The present invention relates generally to gas storage and dispensing systems, and particularly to systems of such type utilizing a monolithic carbon sorbent as a gas storage medium.

DESCRIPTION OF THE RELATED ART

The physical adsorbent-based gas storage and dispensing system disclosed in Tom et al. U.S. Pat. No. 5,518,528 has revolutionized the transportation, supply and use of hazardous gases in the semiconductor industry. The system includes a vessel holding a physical adsorbent medium such as molecular sieve or activated carbon, having sorptive affinity for the gas that is to be stored in and selectively dispensed from the vessel. The gas is held in the vessel in an adsorbed state on the sorbent medium at reduced pressure relative to a corresponding empty (of sorbent) vessel holding an equivalent amount of gas in the "free" (unadsorbed) state.

By such reduced pressure storage, the safety of the gas storage and dispensing operation is substantially improved, since any leakage will result in a very low rate of egress of gas into the ambient environment, relative to a conventional high pressure gas storage cylinder. Further, the low pressure operation of the adsorbent-based system is associated with a lower likelihood of such gas leakage events, since the reduced pressure reduces the stress and wear on system components such as valves, flow controllers, couplings, joints, etc.

In such adsorbent-based gas storage and dispensing systems, the working capacity of the physical adsorbent medium is an operating constraint. The working capacity is the amount of gas that can be stored ("loaded") on the sorbent medium and desorptively removed from such sorbent medium for use. The working capacity is a function of the storage pressure of the gas in the sorbent medium-containing gas storage vessel, and the dispensing condition of the desorbed gas (e.g., dispensing pressure of the desorbed gas, when pressure differential is used to effect desorption, and temperature levels of respective storage and dispensing conditions, when thermal desorption of gas is used as the dispensing modality), and the type and character of the sorbent medium itself (e.g., involving such parameters as sorbent media size, shape, porosity, pore size distribution, and tortuosity of interior pore passages).

The art is continually seeking improvement in working capacity of the physical adsorbent-based gas storage and dispensing system.

SUMMARY OF THE INVENTION

The present invention relates to physical adsorbent-based gas storage and dispensing systems, and to an improved working capacity system of such type.

In one aspect, the present invention relates to a fluid storage and dispensing apparatus, comprising a cylindrical fluid storage and dispensing vessel having an interior volume, wherein the interior volume contains a physical adsorbent for sorptively retaining a fluid thereon and from which the fluid is desorbable for dispensing from the vessel, and a valve head coupled to the vessel for dispensing desorbed fluid from the vessel, wherein the physical adsorbent comprises a pyrolyzed monolithic carbon physical adsorbent that is characterized by at least one of the following characteristics:

(a) a fill density measured for arsine gas at 25° C. and pressure of 650 torr that is greater than 400 grams arsine per liter of adsorbent;
(b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
(c) having a bulk density of from about 0.80 to about 2.0 grams per cubic centimeter, preferably from 0.9 to 2.0 grams per cubic centimeter.

In another aspect, the invention relates to a fluid storage and dispensing vessel having disposed therein a monolithic sorbent that is characterized by at least one of the following characteristics:

(a) a fill density measured for arsine gas at 25° C. and pressure of 650 torr that is greater than 400 grams arsine per liter of adsorbent;
(b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
(c) a bulk density of from about 0.80 to about 2.0 grams per cubic centimeter.

A further aspect of the invention relates to a method of making a gas package useful for storing and dispensing gas, comprising: providing a cylindrical gas storage and dispensing vessel; disposing a physical adsorbent in the vessel having sorptive affinity for said gas; and coupling said vessel with a valve head containing an actuatable valve; wherein the physical adsorbent comprises a monolithic carbon physical adsorbent that is characterized by at least one of the following characteristics:

(a) a fill density measured for arsine gas at 25° C. and pressure of 650 torr that is greater than 400 grams arsine per liter of adsorbent;
(b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
(c) a bulk density of from about 0.80 to about 2.0 grams per cubic centimeter.

Another aspect of the invention relates to a method of packaging gas for subsequent dispensing, said method comprising: providing a cylindrical gas storage and dispensing vessel having disposed therein a physical adsorbent having sorptive affinity for said gas, said vessel being coupled with a valve head containing a valve that is actuatable for said subsequent dispensing; charging said gas to said vessel for adsorption on said physical adsorbent; and sealing said vessel; wherein the physical adsorbent comprises a monolithic carbon physical adsorbent that is characterized by at least one of the following characteristics:
(a) a fill density measured for arsine gas at 25° C. and pressure of 650 torr that is greater than 400 grams arsine per liter of adsorbent;
(b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
(c) a bulk density of from about 0.80 to about 2.0 grams per cubic centimeter.

A still further aspect of the invention relates to a method of supplying gas to a gas-utilizing process, said method comprising: providing a gas package including a cylindrical gas storage and dispensing vessel containing a physical adsorbent and gas adsorbed on said physical adsorbent, and a valve head coupled to said vessel, said valve head including a valve that is actuable for gas dispensing; actuating the actuatable valve in said valve head for gas dispensing, desorbing gas from the physical adsorbent, and dispensing gas from the vessel to said gas-utilizing process; wherein the physical adsorbent comprises a monolithic carbon physical adsorbent that is characterized by at least one of the following characteristics:
(a) a fill density measured for arsine gas at 25° C. and pressure of 650 torr that is greater than 400 grams arsine per liter of adsorbent;
(b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
(c) a bulk density of from about 0.80 to about 2.0 grams per cubic centimeter.

Other aspects, features and embodiments of the present invention will be more fully apparent from the ensuing disclosure and appended claims.

DETAILED DESCRIPTION OF THE INVENTION, AND PREFERRED EMBODIMENTS THEREOF

The present invention is based on the discovery that a physical adsorbent-based fluid storage and dispensing apparatus may be fabricated utilizing a fluid storage and dispensing vessel having a monolithic carbon adsorbent material therein, with surprising and unexpected advantages as regards the nature and extent of sorption and desorption of gas on the adsorbent, the packing density achievable for the physical sorbent medium in the vessel, and the utility of the fluid storage and dispensing apparatus comprising such vessel for semiconductor manufacturing operations.

The present invention thus achieves a substantial advance in the art over adsorbent-based gas storage and dispensing systems of the type described in Tom et al. U.S. Pat. No. 5,518,528 which heretofore have used physical sorbent media in a finely divided form, such as a so-called bead activated carbon. In accordance with the present invention, the gas storage and dispensing system can be significantly improved in working capacity when the activated carbon is provided, not in a bead or particulate form, but rather in a monolithic form of specific character.

The level of improvement achievable by the use of a monolithic form of activated carbon, relative to the finely divided forms used in the prior art, is highly unexpected, and is even more surprisingly improved when the gas storage and dispensing vessel is of a shape conforming to the adsorbent monolith.

For example, when the vessel is of a preferred cube or other rectangular parallelepiped shape, consistent with the disclosure of U.S. patent application Ser. No. 10/314,777 filed Dec. 9, 2002 in the names of Dennis Brestovansky, et al., for "Rectangular Parallelepiped Fluid Storage and Dispensing System," issued on Jan. 31, 2006 as U.S. Pat. No. 6,991,671, the use of a conformably shaped monolith can increase the working capacity of the physical adsorbent-based gas storage and dispensing system by at least 85% relative to a prior art system using a gas storage cylinder of the same "footprint" and vessel interior volume, filled with bead activated carbon.

By way of background to explanation of the unanticipated advantages of the preferred packaging of the monolithic physical adsorbent of the invention in a rectangular parallelepiped conformation vessel in the physical adsorbent-based fluid storage and dispensing apparatus, it would on initial consideration appear to be highly disadvantageous to employ a rectangular parallelepiped conformation for a physical-adsorbent-based fluid storage and dispensing system, since: (i) a rectangular parallelepiped vessel has six faces, and twelve weld-lines required for fabrication if each face of the vessel is a separate piece (by contrast, a cylindrical vessel may be formed without seams from tubular rolled steel stock); (ii) consistent with (i), the fabrication cost of a rectangular conformation vessel would be expected to be substantially higher than for a corresponding cylindrical vessel; (iii) a rectangular parallelepiped conformation involves "sharp" corners at the juncture of adjacent perpendicularly oriented walls that offer the potential of forming voids at the line of juncture, wherein the sorbent bed would not "pack" against the corner, relative to a corresponding cylindrical geometry vessel (which is free of such corners, and instead is a minimum cross-sectional area shape circumscribing the bed of physical sorbent material in the interior volume of the vessel); and (iv) the intersection of two perpendicular walls with one another produces a joint that is susceptible to rupture by pressure or force directed thereon, relative to a "seamless" cylindrical vessel.

It has been determined, however, that the rectangular parallelepiped conformation results in a vessel which does have less tightly packed sorbent bed regions adjacent the seams at the intersection of adjacent walls, but that rather than being a disadvantage, such lower density sorbent bed regions are in fact advantageous as higher gas flow conductance pathways for interstitial desorbed or unadsorbed gas to flow out of the bulk volume of the sorbent bed.

Further, precisely because the cylindrical vessel is a minimum cross-sectional area conformation, with a minimum circumferential extent of circumscribing wall area, the amount of sorbent that is "presented" to the wall in the cylindrical vessel is maximized. Considering the converse, the peripheral extent of the wall that bounds (is adjacent to) the sorbent bed in cross-section is much greater in the rectangular parallelepiped conformation than in the cylindrical vessel. The rectangular parallelepiped conformation thereby enables higher volume egress of gas from the vessel than from a correspondingly sized cylindrical vessel, because the wall surface bounding the sorbent bed is non-adsorbing in character, and there is proportionally more of it in the rectangular conformation vessel, at the outer margins of the sorbent bed, than there is in the cylindrical vessel. As a result, the desorbed gas at the wall regions is less readsorbed subsequent to its initial desorptive release from the sorbent medium than desorbed gas in the interior portions of the sorbent bed.

For these reasons, the rectangular parallelepiped vessel conformation has particular utility for holding the monolithic form of the physical adsorbent of the present invention.

As used herein, "monolithic" means that the sorbent medium is in a unitary or block-like form, e.g., in the form of blocks, bricks, discs, boules, etc., in contradistinction to conventional finely divided forms such as beads, particles, granules, pellets, and the like, which are generally utilized in the form of a bed comprising a multiplicity of such beads, particles, granules, pellets, etc. Thus, in the bed form of multiple finely divided physical adsorbent elements, the void volume of the active sorbent is in major part interstitial, or interparticle, in character, varying according to the dimensions, shape and packing density of the sorbent particles. By contrast, in a monolithic form, the void volume of the active sorbent is in form of porosity intrinsic to the sorbent material and voids that may have been formed in the bulk sorbent body during its processing.

The present invention in one aspect relates to a fluid storage and dispensing apparatus, comprising a fluid storage and dispensing vessel having an interior volume, wherein the interior volume contains a physical adsorbent sorptively retaining a fluid thereon and from which the fluid is desorbable for dispensing from the vessel, and a dispensing assembly coupled to the vessel for dispensing desorbed fluid from the vessel, wherein the physical adsorbent comprises a monolithic carbon physical adsorbent. The pyrolyzed monolith carbon physical adsorbent in the vessel is characterized by at least one of the following characteristics:

(a) a fill density measured for arsine gas at 25° C. and pressure of 650 torr that is greater than 400 grams arsine per liter of adsorbent;
(b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
(c) having been formed by pyrolysis and optional activation, at temperature(s) below 1000° C., having a bulk density of from about 0.80 to about 2.0 grams per cubic centimeter, preferably from 0.9 to 2.0 grams per cubic centimeter, more preferably from 1 to 1.3 grams per cubic centimeter, and most preferably from 1.05 to 1.25 grams per cubic centimeter.

The monolithic adsorbent can be in the form of a single monolithic adsorbent article, or a multiplicity of monolithic adsorbent articles. The adsorbent can be suitably shaped to conform to the interior volume of the vessel in which it is disposed, and preferably occupies at least 60% of the interior volume of the vessel, e.g., from 75 to 95% of such interior volume. While the invention is discussed more fully hereinafter in respect of containment of the monolithic adsorbent in the preferred rectangular parallelepiped shaped vessel, it will be appreciated that the invention is not thus limited, and that other vessel shapes and conformations can be utilized, e.g., cylindrical-shaped vessels, barrel-shaped vessels, frustoconical-shaped vessels, etc.

The monolithic adsorbent can be formed as the pyrolysis product of an organic resin, and more generally can be formed from any suitable pyrolyzable material, such as for example polyvinylidene chloride, phenol-formaldehyde resins, polyfurfuryl alcohol, coconut shells, peanut shells, peach pits, olive stones, polyacrylonitrile, and polyacrylamide. The adsorbent can be formed in the fluid storage and dispensing vessel in which the fluid will be stored for subsequent dispensing, i.e., in situ, or the adsorbent can be formed and then introduced into the fluid storage and dispensing vessel. In one embodiment, the adsorbent has at least 20% of its porosity in pores with a diameter of less than 2 nanometers.

The adsorbent can be provided in the fluid storage and dispensing vessel as a multiplicity of monolithic adsorbent articles that aggregately constitute the adsorbent mass. In such multiple monolithic article arrangement, each of the multiplicity of discrete monolithic adsorbent articles can have a length that is between 0.3 and 1.0 times the height of the interior volume of the vessel, and a cross-sectional area that is between 0.1 and 0.5 times the rectangular cross-sectional area of the vessel. Each of the multiplicity of discrete monolithic articles can have a rectangular parallelepiped shape or alternatively a cylindrical or other suitable shape. In the interior volume of the fluid storage and dispensing vessel, the discrete monolithic articles can be laterally and/or longitudinally abutted in surface contact with adjacent monolithic members. In one embodiment, each of the multiplicity of discrete monolithic articles has a length to cross-sectional dimension ratio, L/D, that is from about 2 to about 20, e.g., in a range of from about 4 to about 15, where L is the length or major axis dimension of the monolithic carbon sorbent article, and D is the transverse or minor axis dimension. In another embodiment, the monolithic adsorbent article can have a disc shape, with a height to diameter ratio, H/D, that is from about 0.10 to about 0.80, more preferably from about 0.15 to about 0.60, and most preferably from about 0.20 to about 0.50. In a particular embodiment, the disc-shaped monolithic adsorbent article can have a height to diameter ratio, H/D, that is in a range of from about 0.2 to about 0.3.

The fluid in the fluid storage and dispensing vessel that is sorptively retained on the adsorbent, and desorbed under suitable desorbing conditions for dispensing of fluid, can be fluid of any suitable type, e.g., fluid having utility in semi-conductor manufacturing, such as hydrides, halides and organometallic gaseous reagents, e.g., silane, germane, arsine, phosphine, phosgene, diborane, germane, ammonia, stibine, hydrogen sulfide, hydrogen selenide, hydrogen telluride, nitrous oxide, hydrogen cyanide, ethylene oxide, deuterated hydrides, halide (chlorine, bromine, fluorine, and iodine) compounds, and organometallic compounds.

The fluid in the vessel can be stored at any suitable atmospheric, sub-atmospheric or super-atmospheric pressure, e.g., pressure below 2500 torr, such as in a range of from about 20 torr to about 1200, or pressure in a range of from about 20 torr to about 750 torr for subatmospheric pressure supply of gases for ion implantation or other subatmospheric pressure application.

The vessel holding the adsorbent having fluid adsorbed thereon can be formed of any suitable vessel material(s) of construction, such as metals (e.g., steel, stainless steel, aluminum, copper, brass, bronze, and alloys thereof), glasses, ceramics, vitreous materials, polymers, and composite materials.

The vessel can be of any suitable shape and size, as appropriate to the specific fluid storage and dispensing application. The vessel can, for example, be of a rectangular parallelepiped shape, being of elongate vertically upstanding form, with a square cross-section, or the vessel can be cylindrical with a circular cross-section, or in any other appropriate shape, size and form.

In one embodiment, the invention utilizes a physical adsorbent of monolithic form in a rectangular parallelepiped vessel defining a closed interior volume and having a port to which is coupled a gas dispensing assembly, for selective discharge of gas from the vessel. The sorbent medium in the monolithic form of the present invention provides sufficient capacity for sorptive retention of the sorbate gas in the desired quantity, good desorptive release of gas under desorption conditions, and good working capacity with good heels behavior (i.e., high extent of desorption of initially adsorbed gas), and has an appropriate sorptive affinity for the gas of interest so that low gas pressure is maintained in the interior volume of the vessel during storage of gas therein.

The physical adsorbent in accordance with the present invention can be of any suitable monolithic form, e.g., in the form of blocks, bricks, boules or similar forms of the adsorbent material that are of a size commensurate with the fluid storage and dispensing vessel, so that vessel contains one or a small number, e.g., less than 75, more preferably less than 20, of the discrete monolithic articles. In a further preferred aspect, the vessel contains no more than 8 such discrete monolithic articles, even more preferably no more than four such articles, and most preferably the vessel contains a single monolithic physical adsorbent article.

The monolithic article(s) deployed in the fluid storage and dispensing vessel provide(s) an aggregate sorbent mass that is preferably conformed in size and shape to the interior volume of the fluid storage and dispensing vessel, so that the sorbent mass of the monolithic article(s) occupies at least 60% of the interior volume of the vessel, preferably in a range of from about 75% to about 95% of the interior volume of such vessel.

If provided as a single monolithic sorbent article, the sorbent medium may for such purpose be formed in situ in the vessel, e.g., by pyrolysis of an organic resin that is in liquid or otherwise flowable form, with which the vessel is filled to a desired extent prior to pyrolysis of same in the vessel.

If alternatively provided in the form of multiple monolithic articles, each of such articles can be provided with a length that is between 0.3 and 1.0 times the height of the interior volume of the vessel, and a cross-sectional area that is between 0.1 and 1.0 times the rectangular cross-sectional area of the vessel. Each monolithic member can have a rectangular parallelepiped shape for maximizing the volumetric usage of the interior volume of the vessel when the vessel is of rectangular parallelepiped shape, wherein each of the monolithic members may be laterally and/or longitudinally abutted in surface contact with adjacent monolithic members in the interior volume of the vessel. Alternatively, in some instances, it may be desirable for the sorbent monolithic members to be in the form of solid cylinders, with the respective cylindrical members being loaded into the interior volume so as to tangently abut one another along their facing side surface, and to at least partially abut one another in face-to-face contact at their circular cross-section end surfaces. In fluid storage and dispensing vessels of shapes other than cubic or other rectangular parallelepiped shapes, the monolithic sorbent article(s) may be correspondingly formed to conform to the shape of the interior volume of the vessel. For example, the fluid storage and dispensing vessel can be of cylindrical shape, with monolithic adsorbent articles therein comprising a vertical stack of disc-shaped bodies of adsorbent, each having diameter conforming it at its periphery to the shape of the vessel, in close proximity to the facing inner wall surface of the vessel. In such cylindrical-shaped vessel, or in vessels of other shapes, each of the monolithic bodies of adsorbent disposed in the vessel can have a cross-sectional area that is between 0.1 and 1.0 times the rectangular cross-sectional area of the vessel.

The level of improvement attendant the use of a monolithic form of activated carbon over finely divided particulate forms of the prior art is unexpected because physical adsorbent materials are generally classified in terms of their surface area available for sorptively retaining the working gas (adsorbate), and hence particulate forms with their high surface to volume ratio have been considered inherently superior to bulk forms such as blocks and bricks (i.e., monolithic forms) having a lower apparent surface-to-volume ratio. Thus, one would expect intuitively that monolithic forms of adsorbent would be low efficiency forms, having a reduced sorptive capacity and working capacity.

It has been discovered, however, that a carbon monolith may be formed having a similar micropore volume as corresponding bead carbon, but with a substantially higher density, e.g., a density in a range of from about 25% to about 80% higher than the compacted density of the corresponding bead carbon, and that such high density monolith when used in a physical adsorbent-based gas storage and dispensing system provides a striking improvement in mass of gas adsorbed per unit volume of the sorbent in comparison to a bed of bead carbon.

Carbon monoliths useful in the broad practice of the present invention include gross brick, block and ingot forms, as bulk forms, preferably having three-dimensional (x, y, z) character wherein each of such dimensions is greater than 1.5, and preferably greater than 2 centimeters. For example, the carbon monolith may be in the form of a monolith briquette, as made from a polymeric char such as polyvinylidene chloride (PVDC) or other suitable polymer, having a high bulk density (measured with voids), e.g., on the order of from about 0.80 to about 2.0 grams per cubic centimeter, preferably from 0.9 to 2.0 grams per cubic centimeter, more preferably from 1 to 1.3 grams per cubic centimeter, and most preferably from 1.05 to 1.25 grams per cubic centimeter, with high working capacity (high microporosity and low heel) and pore tortuosity that is sufficiently low to ensure ready and rapid rate adsorption and desorption.

In one embodiment, the monolithic carbon sorbent of the invention includes a doping agent on the active carbon to minimize decomposition of the sorbate fluid during extended storage. Illustrative of doping agents that can be usefully employed in the broad practice of the invention are boric acid ($H_3BO_3$), sodium tetraborate ($Na_2B_4O_7$), sodium silicate ($Na_2SiO_3$) and disodium hydrogen phosphate ($Na_2HPO_4$).

The monolithic carbon adsorbent articles in another aspect can have a length to cross-sectional dimension ratio, L/D, that is from about 2 to about 20, and more preferably from about 4 to about 15, where L is the length or major axis dimension of the monolithic carbon sorbent article, and D is the transverse or minor axis dimension. In a specific embodiment, the monolithic carbon adsorbent is provided in the form of 1"×1" square cross-section PVDC char monolith briquettes, approximately 6" in height.

A preferred monolithic carbon adsorbent comprises pyrolysis products of Saran A, Saran MC-10S or Saran XPR-1367-D-01452-050 PVDC homopolymers or copolymers, as ultramicroporous carbons having a high proportion of slit-shaped pores of small dimension, e.g., in a range of from about 0.3 to about 0.75 nanometers.

Figure 5:
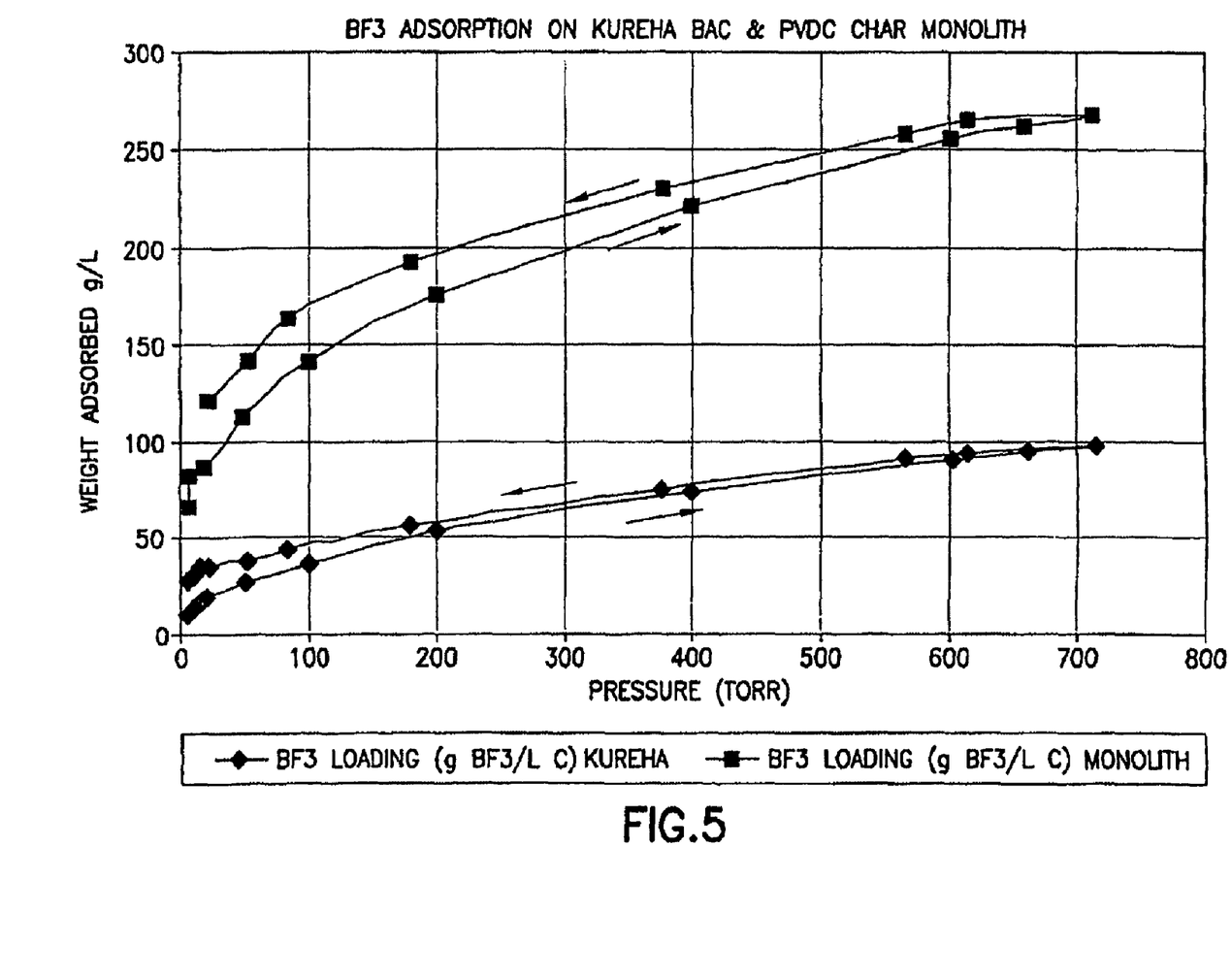
FIG. 5 is a graph of adsorbed weight, in grams, of boron trifluoride ($BF_3$) adsorbed per liter of carbon, as a function of pressure level, in torr, for a Kureha 578-66-6 bead activated carbon (data points marked by solid diamond markers) and carbon formed from polyvinylidene chloride polymer (Saran A, Dow Chemical Co.) (data points marked by solid square markers).

When the monolithic carbon sorbent has pores with a diameter of less than about 2 nanometers, the monolithic carbon sorbent is able to adsorb gases, e.g., boron trifluoride, above their critical temperature to an extent that is proportional to the micropore volume of the sorbent material. Preferred monolithic carbon sorbent materials for such purpose have a high proportion of pores, e.g., at least 50% of porosity, in the small micropore, e.g., ultramicropore, size range. This effect may be seen by reference to FIG. 5, which is a graph of weight in grams of boron trifluoride ($BF_3$) adsorbed per liter of carbon, as a function of pressure level, in torr, for (i) a Kureha bead activated carbon (data points marked by solid diamond markers) and (ii) carbon formed from polyvinylidene chloride polymer (Saran A, Dow Chemical Co.) (data points marked by solid square markers).

Although micropore volume is an important criterion for selecting carbon for use in the monolithic carbon adsorbent systems of the invention, and micropore volume is desirably maximized, gases stored in a fixed volume vessel are appropriately compared on a volume per liter of adsorbent basis. The adsorbent packing density in such instance becomes extremely important. To this end, the monolithic carbon eliminates void volume in the fluid storage and dispensing vessel in which it is employed.

Void volume in the fluid storage and dispensing vessel in accordance with the present invention, in a preferred embodiment, does not exceed about 40% of the total interior volume of the vessel, and more preferably is as low as possible. The packing density of the monolithic carbon sorbent is desirably as high as possible, with maximum micropore volume on a volume per volume of adsorbent basis, and a high proportion of pore volume being in ultramicropores. The conformation of the micropores is also important, with the pores being desirably slit-shaped to provide high adsorption levels, but not so small so that the slit conformation interferes with ready gas release under desorption conditions, e.g., desorption at pressure levels on the order of 40 torr.

During activation of carbon to form activated carbon, the pores are widened at elevated temperature in the presence of a non-oxidizing gas such as nitrogen, followed by exposure to an oxidizing gas such as oxygen or steam for a short duration, and then cooling in a non-oxidizing atmosphere. In such activation, the level of burn-off of the material is carefully controlled, since a high level of burn-off causes widening of the pores, with an increase in micropore volume and concomitant reduction of particle density.

Figure 1:
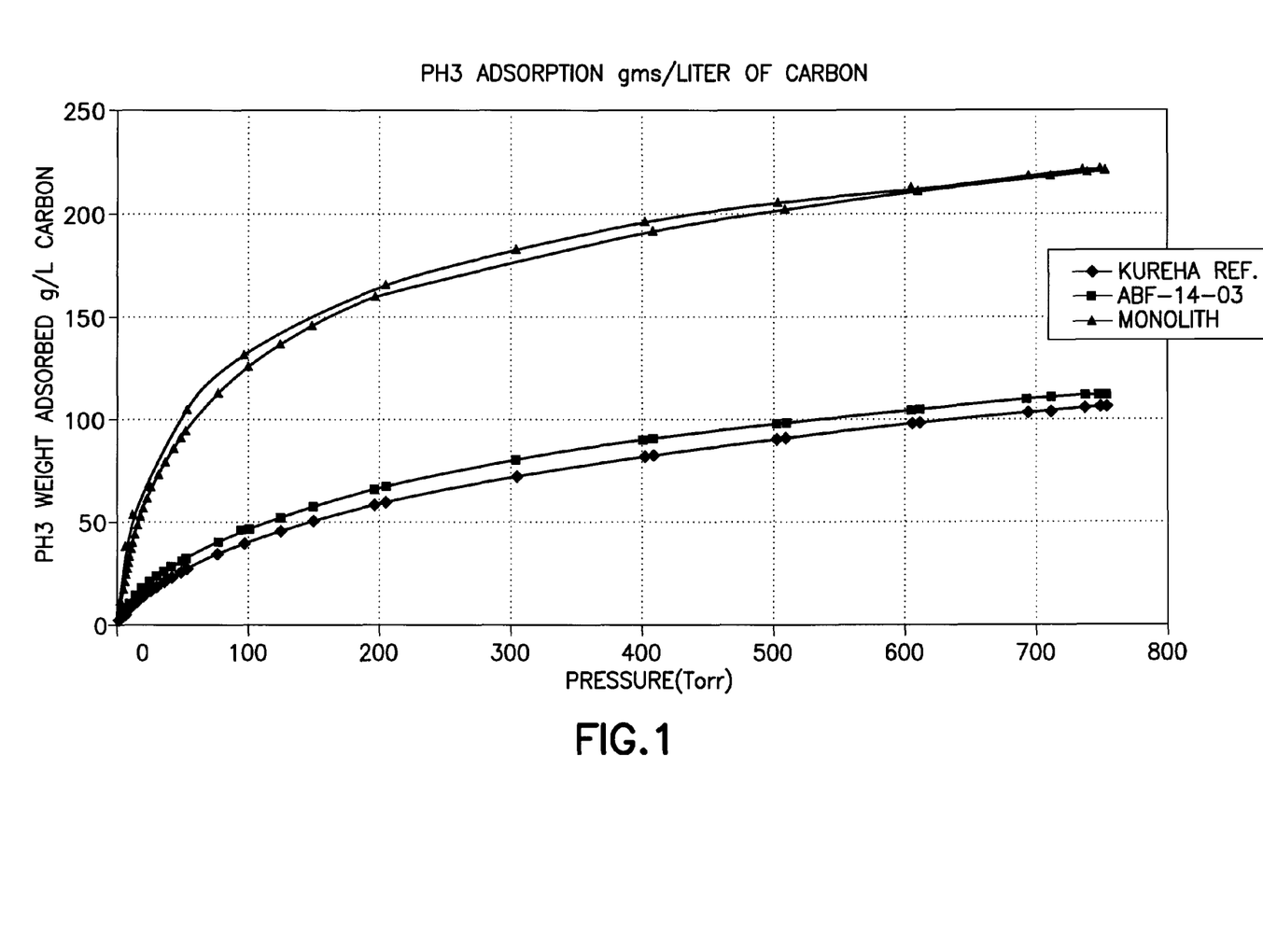
FIG. 1 is a graph of weight in grams of phosphine ($PH_3$) adsorbed per liter of carbon, as a function of pressure level, in torr, for a Kureha 578-66-6 bead activated carbon (data points marked by solid diamond markers), a Takachiho ABF 14-03 particulate activated carbon (data points marked by solid square markers), and carbon formed from polyvinylidene chloride polymer (Saran A, Dow Chemical Co.) (data points marked by open triangular markers).
Figure 2:
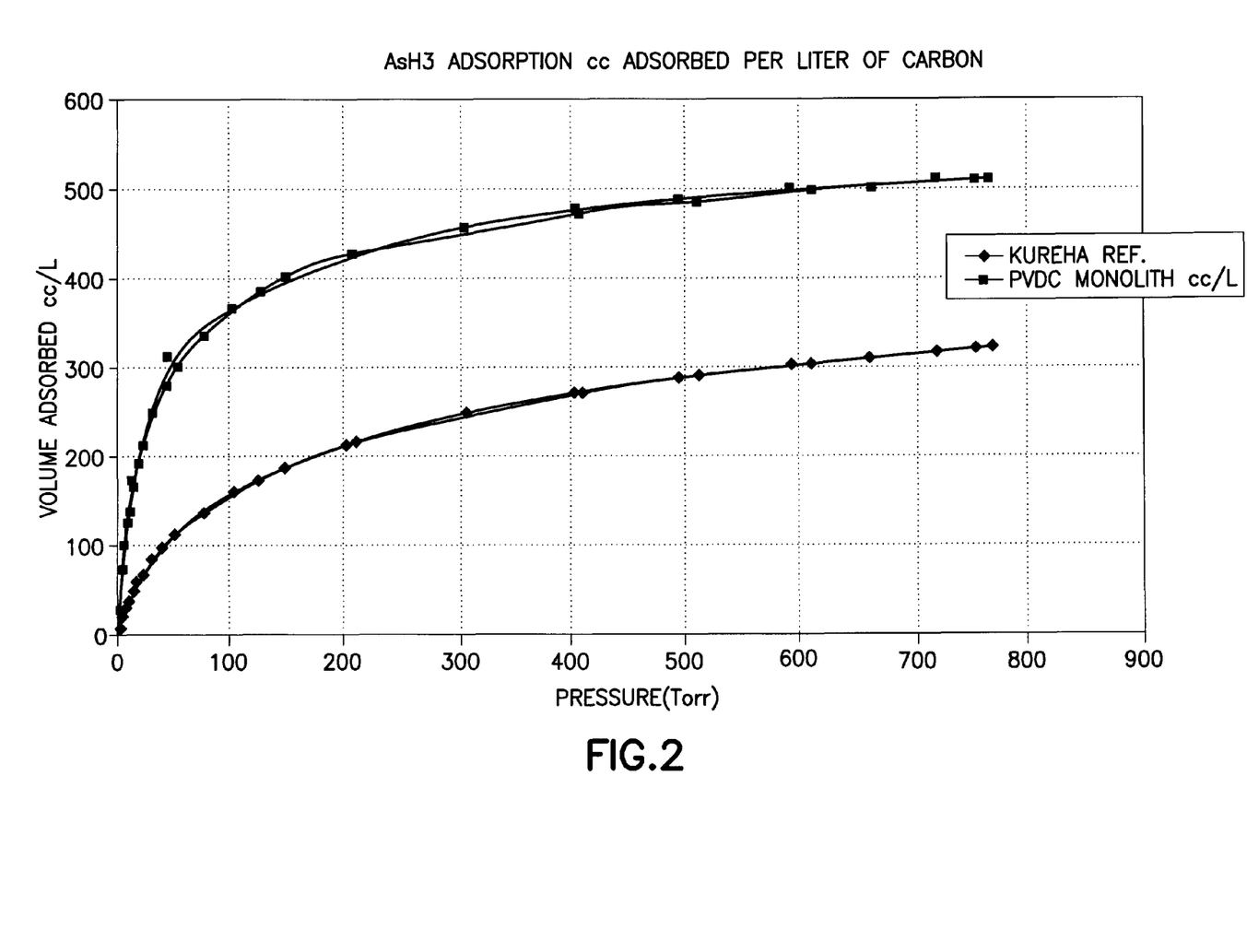
FIG. 2 is a graph of volume, in cubic centimeters, of arsine ($AsH_3$) adsorbed per liter of carbon, as a function of pressure level, in torr, for a Kureha 578-66-6 bead activated carbon (data points marked by solid diamond markers) and carbon formed from polyvinylidene chloride polymer (Saran A, Dow Chemical Co.) (data points marked by open triangular markers).

The monolithic carbon adsorbent of the invention can be suitably formed in any suitable manner. In one embodiment, the monolithic carbon is formed from a polymeric material such as the polyvinylidene chloride polymer commercially available from The Dow Chemical Company (Midland, Mich.) as Saran A or Saran MC-10S polymer, as pressure molded at suitable pressure, e.g., a pressure in a range of from about 10 kilopounds per square inch to about 20 kilopounds per square inch, and then pyrolyzed in a nitrogen gas stream at a temperature of from about 600° C. to about 900° C., e.g., on the order of about 700° C. This process produces a carbon sorbent material having a greatly increased fill density (viz., the weight of gas adsorbed, e.g., in grams, per liter of carbon), as shown in the graphs of FIGS. 1 and 2.

The monolithic carbon adsorbent of the invention represents a significant departure from the practice of the prior art, which has utilized finely divided particles, such as bead activated carbon having a particle diameter of 0.1-1.0 centimeter and more typically a particle diameter of 0.25-2.0 millimeters, or which, in the case of bulk microporous carbon materials (see Wojtowicz et al. U.S. Patent Application Publication US2002/0020292 A1 published Feb. 21, 2002), has utilized high temperature, e.g., >1000° C. and preferably >1100° C., to induce high graphitization levels, in combination with activation involving repetitive chemisorption/desorption steps performed as many as 76 times (see Quinn, et al. U.S. Pat. No. 5,071,820) to achieve suitable micropore volume, surface area and micropore volume per unit volume of carbon adsorbent, a time-consuming and costly approach to obtaining a suitable sorbent material for high-pressure gas storage applications (Wojtowicz et al. U.S. Patent Application Publication US2002/0020292 A1 discloses that optimal storage capacity for the sorbate gas requires that the gas "be introduced into the storage vessel at a pressure in the range of from about 500 psi to about 3500 psi," page 2, paragraph [0013], last sentence).

In contrast to these prior art approaches, the monolithic carbon sorbent of the present invention is formed from a suitable polymeric material, e.g., a polymer selected from among polyvinylidene chloride, phenol-formaldehyde resins, polyfurfuryl alcohol, coconut shells, peanut shells, peach pits, olive stones, polyacrylonitrile, polyacrylamide, etc., that is pressure-moldable, e.g., at a molding pressure up to about 20,000 psi or higher, to yield a pressure-molded "green resin" body that is pyrolyzable at temperature below 1000° C., preferably not exceeding about 900° C., e.g., in a range of from about 500° C. to about 900° C., and more preferably in a range of from about 600° C. to about 900° C., to yield a monolithic carbon material having a fill density of suitably high value for the intended gas storage and dispensing application. Monolithic carbon sorbents useful in the practice of the present invention include those having a fill density measured for arsine gas at 25° C. and a pressure of 650 torr that is in excess of 400 grams arsine per liter of carbon adsorbent, and preferably greater than 450 grams arsine per liter of carbon adsorbent.

The pyrolysis product may be employed as a monolithic sorbent body in accordance with the present invention, as is, but such pyrolysis product preferably is activated in a manner producing a monolithic carbon sorbent product with ultramicroporosity having a high proportion, e.g., at least 30% of porosity, preferably at least 50% of porosity, more preferably at least 60% of porosity, and most preferably at least 70% of porosity, such as 70 to 80% of porosity, of slit-shaped pores having a size in a range of from about 0.3 to about 0.72 nanometer and a significant porosity, e.g., at least 20%, preferably at least 30%, more preferably at least 50%, and most preferably at least 80%, e.g., 80 to 90%, of the overall porosity comprising micropores, with diameter<2 nanometers. The activation process can include any suitable processing steps for enhancing the sorptive affinity of the material for the sorbate gas of interest or otherwise improving the characteristics of the sorbent medium for adsorption/desorption duty. For example, the activation process can include heating in a non-oxidizing atmosphere, e.g., of nitrogen, argon, helium or other non-oxidizing gas, followed by switching of the atmosphere to an oxidizing atmosphere, such as carbon dioxide or steam for a brief duration, before switching to a non-oxidizing atmosphere and cooling to ambient temperature (e.g., room temperature). The specifics of the activation process, e.g., the temperature levels and duration of the successive steps can be readily determined within the skill of the art without undue experimentation, by simple variation of respective process conditions and analytic determination of the resulting sorbent performance, such as fill density, porosimetry characterization, etc.

FIG. 1 is a graph of weight in grams of phosphine ($PH_3$) adsorbed per liter of carbon, as a function of pressure level, in torr, for a Kureha 578-66-6 bead activated carbon (data points marked by solid diamond markers), a Takachiho ABF 14-03 particulate activated carbon (Takachiho Kabushiku Kogyo, Ltd., Tokyo, Japan) (data points marked by solid square markers), and monolithic carbon formed from polyvinylidene chloride polymer (Saran A, Dow Chemical Co.) (data points marked by open triangular markers).

The data in FIG. 1 show that the monolithic carbon formed from PVDC polymer has a substantially higher weight of adsorbed phosphine per liter of carbon than either of the bead activated carbon adsorbent or the Takachiho particulate activated carbon adsorbent, being generally more than twice the sorptive loading of phosphine over the pressure range of from 0 torr to 750 torr.

FIG. 2 is a graph of volume, in cubic centimeters, of arsine ($AsH_3$) adsorbed per liter of carbon, as a function of pressure level, in torr, for a Kureha 578-66-6 bead activated carbon (data points marked by solid diamond markers) and carbon formed from polyvinylidene chloride polymer (Saran A, Dow Chemical Co.) (data points marked by open triangular markers).

FIG. 2 evidences the superiority of the monolithic carbon adsorbent over bead activated carbon for arsine loading. The volumetric loading of arsine, in cubic centimeters, per liter of carbon is 50-100%+higher for the monolithic carbon adsorbent over the pressure range of 0 torr to 770 torr.

Set out below in Table 1 are fill density values of arsine on the three types of adsorbent materials discussed above in connection with FIG. 1, including Kureha 578-66-6 bead activated carbon, Takachiho ABF 14-03 particulate activated carbon, and PVDC char monolithic adsorbent. Each of the materials was evaluated for two samples at an arsine pressure of 650 torr. Fill density was determined on a weight basis, as grams of adsorbed arsine per gram of adsorbent, as well as on a volumetric basis, as grams of adsorbed arsine per liter of adsorbent.

TABLE 1

Arsine Capacity on Non-Monolithic Activated Carbon and Monolithic Carbon

| Adsorbent | Fill Density at 650 Torr Pressure (grams arsine/ gram of adsorbent) | Fill Density at 650 Torr Pressure (grams arsine/ liter of adsorbent) |
|---|---|---|
| Kureha 578-66-6 (sample 1) | 0.51 | 301 |
| Kureha 578-66-6 (sample 2) | 0.51 | 301 |

TABLE 1-continued

Arsine Capacity on Non-Monolithic Activated Carbon and Monolithic Carbon

| Adsorbent | Fill Density at 650 Torr Pressure (grams arsine/ gram of adsorbent) | Fill Density at 650 Torr Pressure (grams arsine/ liter of adsorbent) |
|---|---|---|
| Takachiho ABF 14-03 (sample 1) | 0.55 | 319 |
| Takachiho ABF 14-03 (sample 2) | 0.55 | 319 |
| PVDC char (sample 1) | 0.43 | 486 |
| PVDC char (sample 2) | 0.45 | 504 |

The results in Table 1 show that while the fill density on a weight basis for the monolithic carbon adsorbent was approximately 15-20% lower than for the non-monolithic activated carbon adsorbents, the fill density of the monolithic carbon adsorbent on a volumetric basis was well over 50% higher than the corresponding fill densities of the non-monolithic activated carbon adsorbents.

Table 2 below is a corresponding fill density tabulation for fill density values of phosphine on the three types of adsorbent materials discussed above in connection with FIG. 1, including Kureha 578-66-6 bead activated carbon, Takachiho ABF 14-03 particulate activated carbon, and PVDC char monolithic adsorbent.

TABLE 2

Phosphine Capacity on Non-Monolithic Activated Carbon and Monolithic Carbon

| Adsorbent | Fill Density at 650 Torr Pressure (grams phosphine/ gram of adsorbent) | Fill Density at 650 Torr Pressure (grams phosphine/ liter of adsorbent) |
|---|---|---|
| Kureha 578-66-6 | 0.165 | 97.4 |
| Takachiho ABF 14-03 | 0.184 | 107 |
| PVDC char | 0.188 | 212 |

The results in Table 2 show that the monolithic carbon adsorbent (PVDC char) had a fill density on both weight and volumetric basis that was above those of the non-monolithic forms of activated carbon adsorbent, with the fill density on a volumetric basis being on the order of 100% higher than the volumetric fill density of phosphine on the non-monolithic forms of activated carbon.

The sorbate fluid retained on the monolithic carbon adsorbent in the broad practice of the present invention can be of any suitable type, including for example, hydride gases (such as arsine, phosphine, germane, silane, mono-, di-, and tri-substituted silanes, e.g., alkyl silanes of such types), halide gases (such as boron trifluoride, boron trichloride, halogen-substituted silanes, etc.) and gaseous organometallic compositions.

Illustrative sorbate gas species that are usefully storable and dispensable in the practice of the invention include silane, germane, arsine, phosphine, phosgene, diborane, germane, ammonia, stibine, hydrogen sulfide, hydrogen selenide, hydrogen telluride, nitrous oxide, hydrogen cyanide, ethylene oxide, the deuterated hydrides, halide (chlorine, bromine, fluorine, and iodine) compounds, including such compounds as $F_2$, $SiF_4$, $Cl_2$, $ClF_3$, $GeF_4$, $SiF_4$, boron halides, etc., and organometallic compounds of metals such as aluminum, barium, strontium, gallium, indium, tungsten, antimony, silver, gold, palladium, gadolinium, etc.

The pressure at which the sorbate gas is stored in the vessel may be any suitable pressure appropriate to the application for which the gas storage and dispensing system of the invention is employed. Illustrative pressure levels generally useful in the practice of the invention include pressures not exceeding about 2500 torr, more preferably not exceeding 2000 torr, e.g., a pressure in a range of from about 20 torr to about 1800 torr, or more restrictively from about 20 torr to about 1200 torr. For applications such as ion implantation, the pressure of the gas in the gas storage and dispensing vessel typically does not exceed about 800 torr, and the stored gas may be at subatmospheric pressure, e.g., a pressure in a range of from about 20 torr to about 750 torr.

Figure 3:
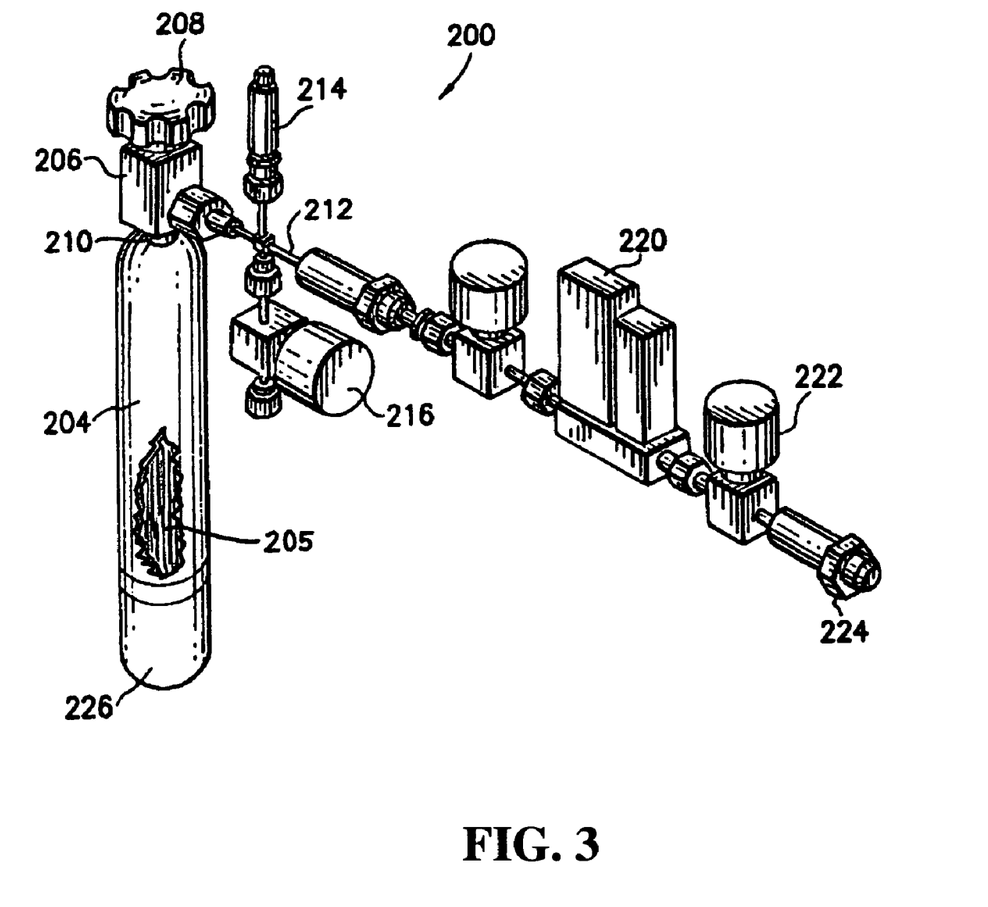
FIG. 3 is a schematic representation of a storage and delivery system utilizing a monolithic sorbent, according to one embodiment of the invention.

FIG. 3 is a schematic representation of a storage and delivery system according to one embodiment of the invention.

As shown, the storage and dispensing system 200 comprises a storage and dispensing vessel 204 that is joined at its upper portion to a valve head 206 comprising part of a dispensing assembly including manual actuator 208 for the valve head on the cylinder. The vessel may be formed of any suitable material of construction, e.g., comprising material such as metals, glasses, ceramics, vitreous materials, polymers, and composite materials. Illustrative metals for such purpose include steel, stainless steel, aluminum, copper, brass, bronze, and alloys thereof. The valve head is joined by means of coupling 210 to a dispensing conduit 212 having disposed therein a pressure transducer 214, an inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for matably engaging the dispensing assembly with downstream piping, valving, or other structure associated with the locus of use of the desorbed fluid, e.g., involving a semiconductor manufacturing facility such as an ion implantation tool using the dispensed gas as an implant species.

The fluid storage and dispensing vessel 204 is shown partially broken away to show the interior monolithic sorbent body 205.

Figure 4:
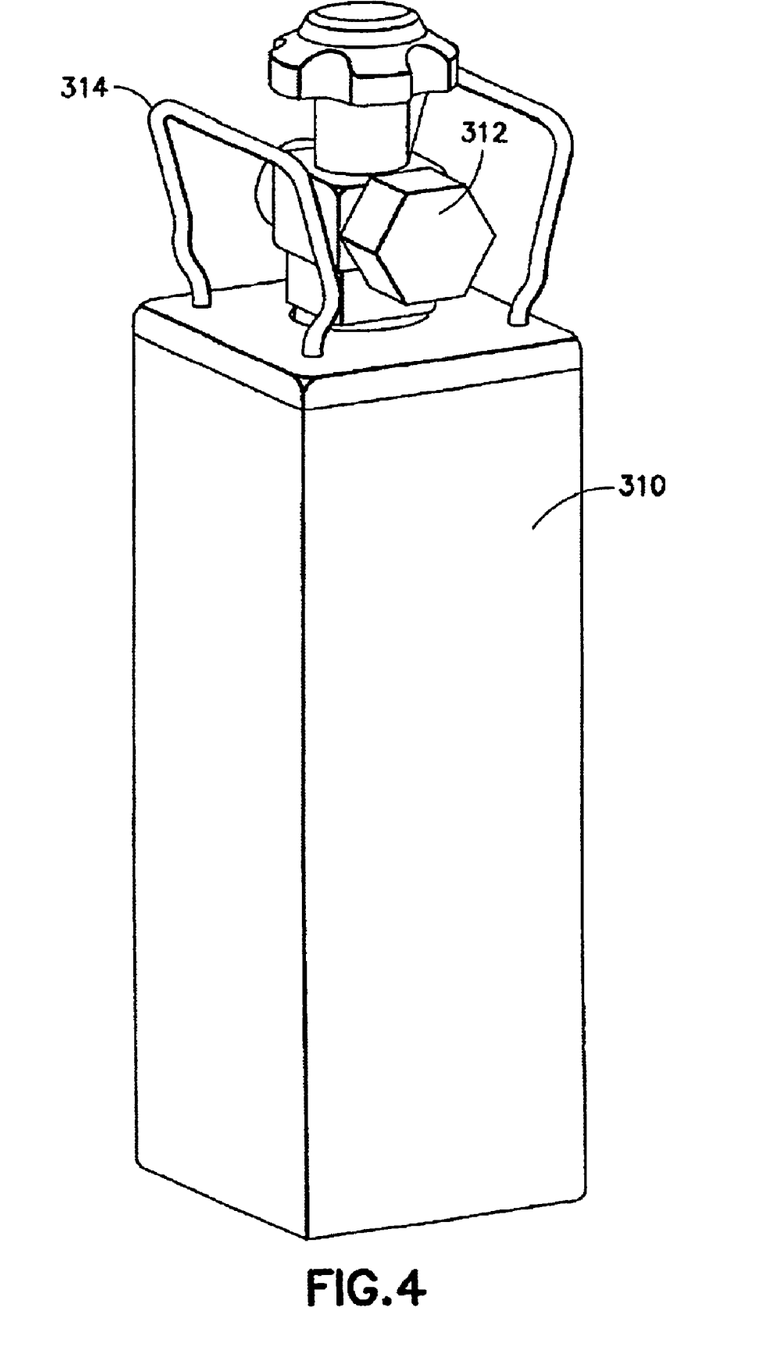
FIG. 4 is a perspective view of a rectangular parallelepiped fluid storage and dispensing vessel utilizing a monolithic sorbent, according to another embodiment of the present invention.

FIG. 4 is a perspective view of a fluid storage and dispensing apparatus employing a rectangular parallelepiped fluid storage and dispensing vessel 310 according to another and preferred aspect of the present invention. The rectangular parallelepiped fluid storage and dispensing vessel 310 is equipped with a pipe valve connection valve head 312 and handles 314 welded to the top face of the vessel. The vessel 310 in a specific embodiment is formed with a welded steel wall construction, having a square cross-section along the vertical (longitudinal) axis of the vessel. The walls of the vessel are 0.100 inch thick carbon steel, and the interior volume of the vessel is 3.62 liters. The handles 314 are ¼ inch rod stock, formed into the shape shown, and welded at the respective ends to the vessel 310.

The dispensing valve of the pipe valve connection valve head 312 is threadably engaged with the vessel 310, by a 1½" pipe thread connection. The valve head may have any suitable number of ports, e.g., single port valve heads, dual port valve heads, 3-port valve heads, etc.

The rectangular parallelepiped fluid storage and dispensing vessel 310 contains a monolithic carbon adsorbent in its interior volume, wherein the monolithic mass may include one or alternatively multiple monolithic carbon bodies, each preferably of a rectangular parallelepiped shape to conform to the shape of the interior volume of the vessel, as previously described.

Figure 6:
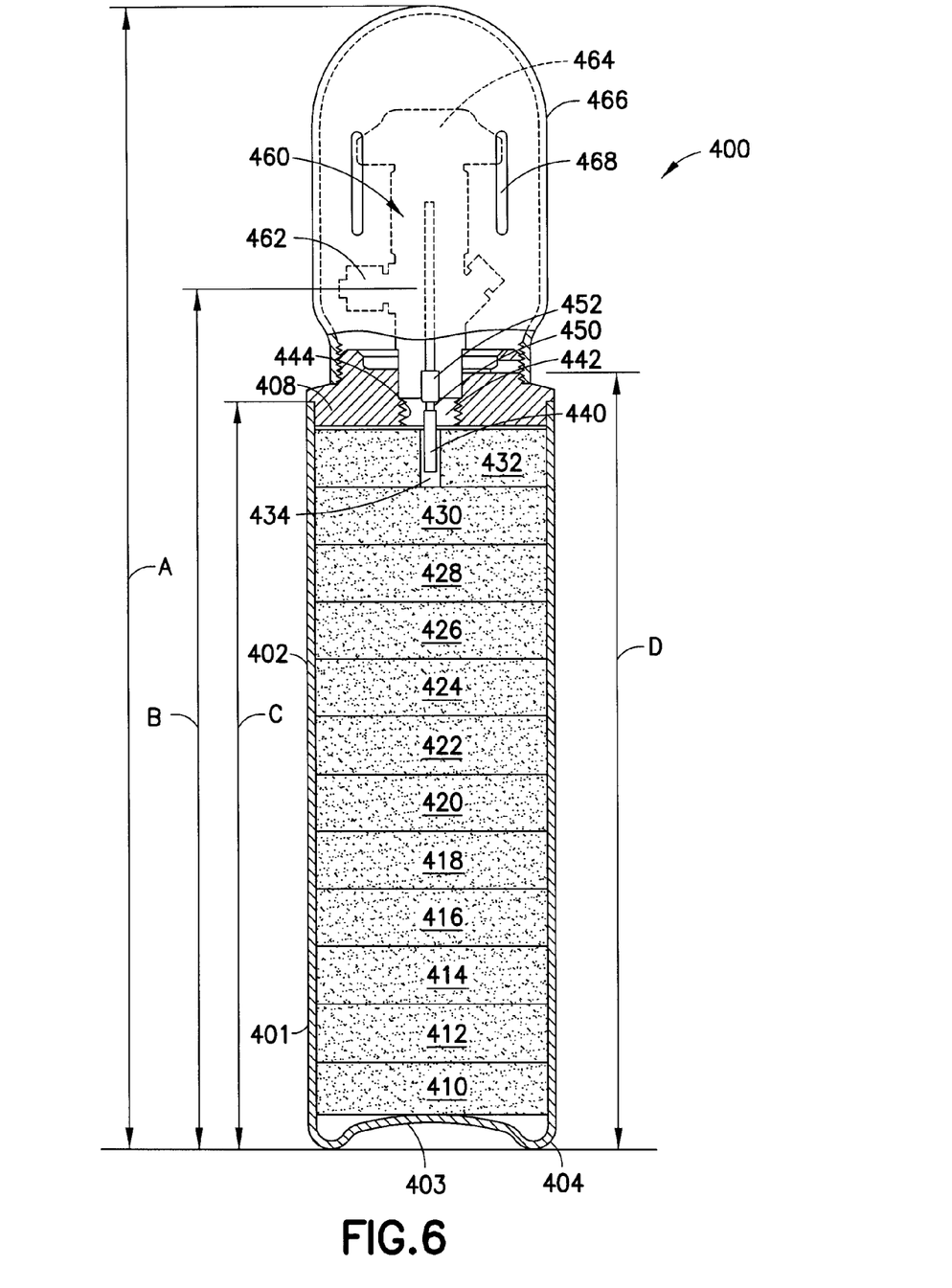
FIG. 6 is an elevation view, in partial section, of a fluid storage and dispensing system utilizing a monolithic sorbent, according to a further embodiment of the invention.

FIG. 6 is an elevation view, in partial section, of a fluid storage and dispensing system 400 utilizing a monolithic sorbent, according to a further embodiment of the invention.

The system 400 includes a cylindrical fluid storage and dispensing vessel 401 having sidewall 402 and floor 403 enclosing an interior volume containing disk-shaped monolithic sorbent articles 410, 412, 414, 416, 418, 420, 422, 424, 426, 428, 430 and 432, stacked in face-to-face relationship to form the vertically extended composite body of sorbent articles within the vessel.

The floor 403 of the vessel 401 is as shown in FIG. 6 of a concave form, with an outer annular portion 404 serving to enclose an interior annular plenum volume that is devoid of sorbent material, and which thereby defines an interior annular space that is in communication with the space between the sidewall 402 and the adjacent stack of disk-shaped articles. The interior annular plenum volume thus permits disengaged (desorbed from the sorbent) or otherwise free gas to flow upwardly along the inner surface of the sidewall, for ultimate dispensing from the vessel.

In the vessel 401, the respective disk-shaped monolithic sorbent articles 410, 412, 414, 416, 418, 420, 422, 424, 426, 428, 430 and 432 may each be of a same diameter and thickness, with the exception that the uppermost monolithic sorbent article 432 has a central passage 434 therein, to accommodate the filter 440.

At its top portion, the upper edges of the sidewall 402 are secured to a neck collar 408, e.g., by welding, brazing, or other suitable securement technique or structure. The neck collar 408 has a central opening 442 therein, communicating with central passage 434 of the uppermost monolithic sorbent article 432, and the central opening 442 has a threaded interior surface 444, with which the complementary threading of valve head 460 can be threadably engaged.

The valve head 460 includes a main valve body having a valve structure therein (not shown) with a threaded lower portion for engagement with the threaded interior surface 444 of the central opening 442 in a leak-tight manner, and the valve head has interior passage(s) therein communicating with the dispense port 462, which may include a fitting threadably engaged with a passage opening in the valve head, for joining to external flow circuitry, to enable gas dispensing from the system 400. The valve head interior passage(s) also communicate with an inlet port of the valve head, in which is disposed the bushing 452 to which is joined feed tube 450 having filter 440 joined to its lower end.

By this arrangement, gas desorbed from the sorbent in the vessel 401 is flowed in the dispensing operation to the central passageway 434, enters the filter 440, flows through feed tube 450 and a central opening in the bushing 452, into the interior passage(s) of the valve head 460. The interior passage(s) of the valve head may be suitably formed to accommodate interaction with a stem assembly and valve element (not shown) that is translatable between a fully open and a fully closed position of the valve in the valve structure within the valve head 460. The stem assembly in turn is coupled with a valve actuator 464, which in the embodiment shown is a handwheel for manual opening and closing of the valve, but which alternatively may comprise an automatic actuator, such as a solenoid actuator, pneumatic actuator, or the like, coupled to suitable actuating circuitry, power supplies, central processor units, etc.

The neck collar 408 at its upper neck portion has an exterior neck surface that is threaded to matably engage a cap 466 that is complementarily threaded on the lower interior surface of the cap. The cap has ventilation openings 468 therein, to allow venting of the interior volume of the cap that is secured to the neck collar 408 of the vessel 401. The cap serves to protect the valve head 460 from impact and environmental exposure, and is readily unscrewed from the neck collar 408 to access the valve head for coupling to gas flow circuitry for the dispensing of gas in the dispensing mode of the system 400.

The dispensing of gas from the vessel 401 may be carried out in any appropriate mode of operation. For example, the valve head 460 may be coupled with gas flow circuitry to a semiconductor process tool or other gas-utilizing apparatus or site, with gas being desorbed under the impetus of a reduced pressure in the flow circuitry external of the vessel. Additionally, or alternatively, the vessel may be subjected to heating, e.g., by the installation of a heating jacket about the vessel, whereby the sorbent is heated to desorb gas therefrom for dispensing. As a still further alternative or additional mode of dispensing, an extraction system, e.g., an extraction pump, eductor, venturi, compressor, turbine, or other device effective to withdraw gas from the vessel, may be employed.

By providing the sorbent medium in the form of monolithic disk-shaped articles in a stacked array as shown in FIG. 6, there is provided a highly compact arrangement in which substantially the full interior volume of the vessel 401, e.g., other than the interior annular space at the lower periphery of the interior volume of the vessel, and the central passage 434 of the uppermost monolithic sorbent article 432, is filled with sorbent. The monolithic sorbent articles can be made of a diameter that is closely proximate to the inner diameter of the vessel, so that there is a minimal clearance between the side edges of the monolithic sorbent articles and the interior sidewall surface of the vessel adjacent thereto, as sufficient to accommodate flow of gas from the sorbent along the sidewall to the upper portion of the vessel for dispensing.

The sorbent in the interior volume of the vessel of FIG. 6 may be provided, as in the illustrated arrangement, by a stack of disk-shaped monolithic articles of sorbent material, or alternatively in other manner. For example, the sorbent may be provided as a unitary cylindrical monolithic article that is installed in the vessel prior to the securement of the neck collar to the upper edges of the sidewall 402. As another alternative, the sorbent may be formed in situ in the vessel interior volume, as described hereinabove.

Figure 7:
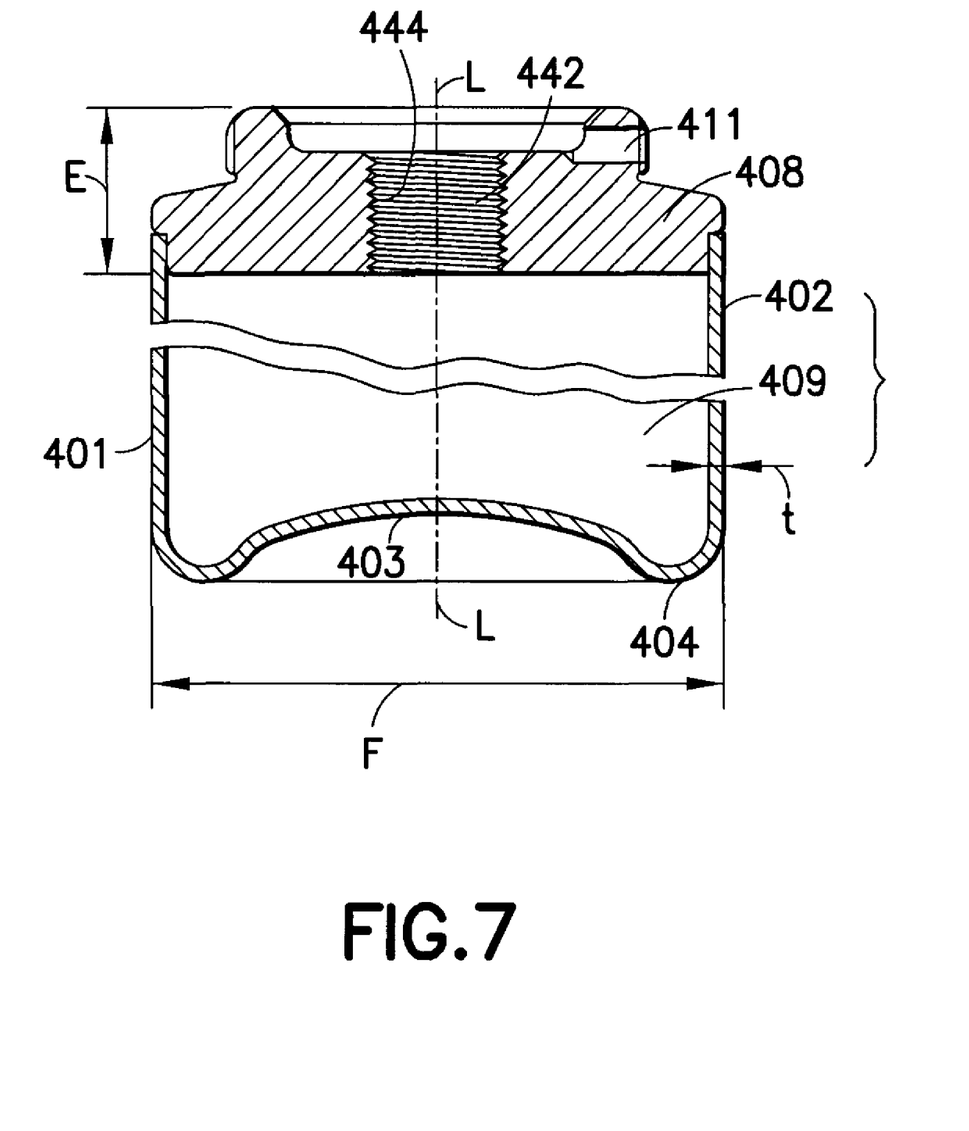
FIG. 7 is an elevational view, in cross-section, of the top and bottom portions of the cylindrical fluid storage and dispensing system of FIG. 6.

FIG. 7 is an elevational view, in cross-section, of the top and bottom portions of the cylindrical fluid storage and dispensing vessel of FIG. 6, showing the details of the neck collar 408 and the lower extremity of the vessel 401.

As shown in FIG. 7, the neck collar 408 is secured to the upper edge of the sidewall 402 of the vessel 401. As mentioned, the neck collar may be secured to the sidewall in any suitable manner, but in general it is preferred to weld the neck collar to the sidewall at its upper end. The vessel 401 has a longitudinal axis L-L, as shown in FIG. 7, along which the monolithic sorbent articles are coaxially aligned with one another in the interior volume 409 of the vessel.

The neck collar 408 has an upper boss section circumscribing the central opening 442 having threaded interior surface 444 to accommodate engagement with the valve head. The upper boss section has a drain passage 411 therein, to allow condensate or other liquid to drain from the neck collar, and thereby minimize the potential for corrosion or other adverse effect associated with the presence of moisture or other liquid.

By way of example, in one specific embodiment of the system 400 shown in FIGS. 6 and 7, and with reference to the dimensional characteristics illustrated in such drawings, the fluid storage and dispensing system may have an overall height A of 19.5 inches, a height B measured from the base of the vessel to the centerline of the dispense port 462 of 14.69 inches, a sidewall height C of 12.74 inches, a height D measured from the base of the vessel to the drain passage 411 of 13.25 inches, a height E measured from the lower face of the neck collar 408 to the top surface of the upper boss section of the neck collar, of 1.275 inches, a vessel diameter F of 4.25 inches, and a sidewall minimum thickness t of 0.085 inch, within ASTM A568 thickness tolerance, with the sorbent articles each having a diameter of $3^{15}/_{16}$ inches and a thickness, measured along the central axis L-L of the vessel, of 1 inch. The cap in such embodiment has a height of 6½ inches, and is formed of stainless steel or carbon steel of suitable character. The vessel is formed of a hot rolled sheet, continuous cast, drawing steel, aluminum killed in accordance with ASTM A1011/A1011M-04a (DS Type A modified).

It will be appreciated that the compositions and methods of the invention may be practiced in a widely variant manner, consistent with the broad disclosure herein. Accordingly, while the invention has been described herein with reference to specific features, aspects, and embodiments, it will be recognized that the invention is not thus limited, but is susceptible of implementation in other variations, modifications and embodiments. Accordingly, the invention is intended to be broadly construed to encompass all such other variations, modifications and embodiments, as being within the scope of the invention hereinafter claimed.

What is claimed is:

1. A pyrolyzed monolith carbon physical adsorbent that is characterized by at least one of the following characteristics:
   (a) a fill density measured for arsine gas at 25° C. and pressure of 650 ton that is greater than 400 grams arsine per liter of adsorbent;
   (b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
   (c) a bulk density of from 0.9 to 2.0 grams per cubic centimeter.

2. The adsorbent of claim 1, wherein the adsorbent is characterized by characteristic (a).

3. The adsorbent of claim 1, wherein the adsorbent is characterized by characteristic (b).

4. The adsorbent of claim 1, wherein the adsorbent is characterized by characteristic (c).

5. The adsorbent of claim 1, wherein the adsorbent is characterized by characteristics (a) and (b).

6. The adsorbent of claim 1, wherein the adsorbent is characterized by characteristics (b) and (c).

7. The adsorbent of claim 1, wherein the adsorbent is characterized by characteristics (a) and (c)

8. The adsorbent of claim 1, wherein the adsorbent is characterized by characteristics (a), (b) and (c).

9. The adsorbent of claim 1, comprising one or more pyrolyzed monolith adsorbent articles, wherein each such article has a disc shape.

10. The adsorbent of claim 9, wherein the adsorbent comprises a multiplicity of said articles in a vertical stack, wherein each article has a height to diameter ratio, H/D, that is from about 0.10 to about 0.80.

11. The adsorbent of claim 1, wherein the adsorbent has a bulk density of from 1 to 1.3 grams per cubic centimeter.

12. The adsorbent of claim 1, wherein the adsorbent has three-dimensional x, y and z dimensions greater than 1.5 centimeters.

13. The adsorbent of claim 1, wherein the adsorbent has at least 30% of its porosity in pores with a diameter of less than 2 nanometers.

14. The adsorbent of claim 1, wherein the adsorbent has a doping agent thereon, wherein the doping agent comprises at least one agent selected from the group consisting of boric acid, sodium tetraborate, sodium silicate, and disodium hydrogen phosphate.

15. The adsorbent of claim 1, wherein the fill density measured for arsine gas at 25° C. and pressure of 650 torr is greater than 450 grams arsine per liter of adsorbent, and wherein at least 50% of overall porosity of said adsorbent comprises pores having a size in a range of from about 0.3 to about 0.72 nanometer.

16. A pyrolyzed monolith carbon physical adsorbent that is characterized by at least one of the characteristics (a) and (b): (a) a fill density measured for arsine gas at 25° C. and pressure of 650 torr that is greater than 400 grams arsine per liter of adsorbent; and (b) at least 30% of overall porosity of said adsorbent comprising slit-shaped pores having a size in a range of from about 0.3 to about 0.72 nanometer, and at least 20% of the overall porosity comprising micropores of diameter<2 nanometers.

17. The adsorbent of claim 16, wherein the adsorbent is characterized by characteristic (a).

18. The adsorbent of claim 16, wherein the adsorbent is characterized by characteristic (b).

19. The adsorbent of claim 16, wherein the adsorbent is characterized by characteristics (a) and (b).

20. A pyrolyzed monolith carbon physical adsorbent that is characterized by the following characteristics:
   (a) a fill density measured for arsine gas at 25° C. and pressure of 650 torr that is greater than 400 grams arsine per liter of adsorbent;
   (b) at least 30% of overall porosity of said adsorbent comprising slit-shaped pores having a size in a range of from about 0.3 to about 0.72 nanometer, and at least 20% of the overall porosity comprising micropores of diameter<2 nanometers; and
   (c) a bulk density of from about 0.8 to about 2.0 grams per cubic centimeter.

* * * * *

UNITED STATES PATENT AND TRADEMARK OFFICE
CERTIFICATE OF CORRECTION

| | | |
|---|---|---|
| PATENT NO. | : 8,002,880 B2 | |
| APPLICATION NO. | : 12/392077 | |
| DATED | : August 23, 2011 | |
| INVENTOR(S) | : J. Donald Carruthers | |

It is certified that error appears in the above-identified patent and that said Letters Patent is hereby corrected as shown below:

Column 16, line 30: "pressure of 650 ton" should be -- pressure of 650 torr --.

Signed and Sealed this
Thirteenth Day of March, 2012

David J. Kappos
*Director of the United States Patent and Trademark Office*